United States Patent
Robinson

Patent Number: 5,857,528
Date of Patent: Jan. 12, 1999

[54] GARDEN TOOL WITH DEPTH CONTROL MECHANISM

[76] Inventor: Lawrence V. Robinson, 7408 Bush Garden Ave., Las Vegas, Nev. 89129

[21] Appl. No.: 916,315

[22] Filed: Aug. 22, 1997

[51] Int. Cl.[6] .............................. A01B 1/10; A01B 1/20; A01B 1/22
[52] U.S. Cl. ..................... 172/372; 172/375; 172/381
[58] Field of Search ..................................... 172/375, 374, 172/381, 373, 372

[56] References Cited

U.S. PATENT DOCUMENTS

| | | | |
|---|---|---|---|
| D. 359,206 | 6/1995 | Bojar | 172/372 X |
| 753,830 | 3/1904 | Lemm | 172/375 |
| 2,225,108 | 12/1940 | Glascock | 172/375 X |
| 2,243,127 | 5/1941 | Roseman | 172/375 X |
| 2,513,033 | 6/1950 | Linden | 172/375 |
| 2,548,012 | 4/1951 | Frost | 172/375 X |
| 2,785,483 | 3/1957 | Gajewski | 172/375 X |
| 3,915,240 | 10/1975 | Pittman | 172/375 X |
| 3,930,544 | 1/1976 | Foster, Sr. | 172/375 |
| 3,965,990 | 6/1976 | Pittman | 172/375 |
| 4,169,509 | 10/1979 | Lowman | 172/375 |
| 4,177,864 | 12/1979 | Donnini | 172/371 |
| 4,214,538 | 7/1980 | Druskin et al. | 172/375 X |
| 4,319,644 | 3/1982 | Young | 172/375 |
| 4,359,104 | 11/1982 | Haapala | 172/375 X |
| 4,549,611 | 10/1985 | Mills | 172/375 |
| 4,901,801 | 2/1990 | Popivalo | 172/375 |
| 5,671,553 | 9/1997 | Burkhard | 172/375 X |

FOREIGN PATENT DOCUMENTS

| | | | |
|---|---|---|---|
| 80780 | 1/1951 | Czechoslovakia | 172/374 |
| 867733 | 11/1941 | France | 172/375 |
| 834918 | 3/1952 | Germany | 172/374 |
| 8162 | of 1911 | United Kingdom | 172/375 |
| 521592 | 4/1940 | United Kingdom | 172/375 |

*Primary Examiner*—Christopher J. Novosad

[57] ABSTRACT

A garden seeding tool is provided including a handle and a blade coupled to the handle and having a pointed end. Further included is a depth control mechanism for preventing the pointed end of the blade from penetrating the ground past a predetermined depth.

4 Claims, 3 Drawing Sheets

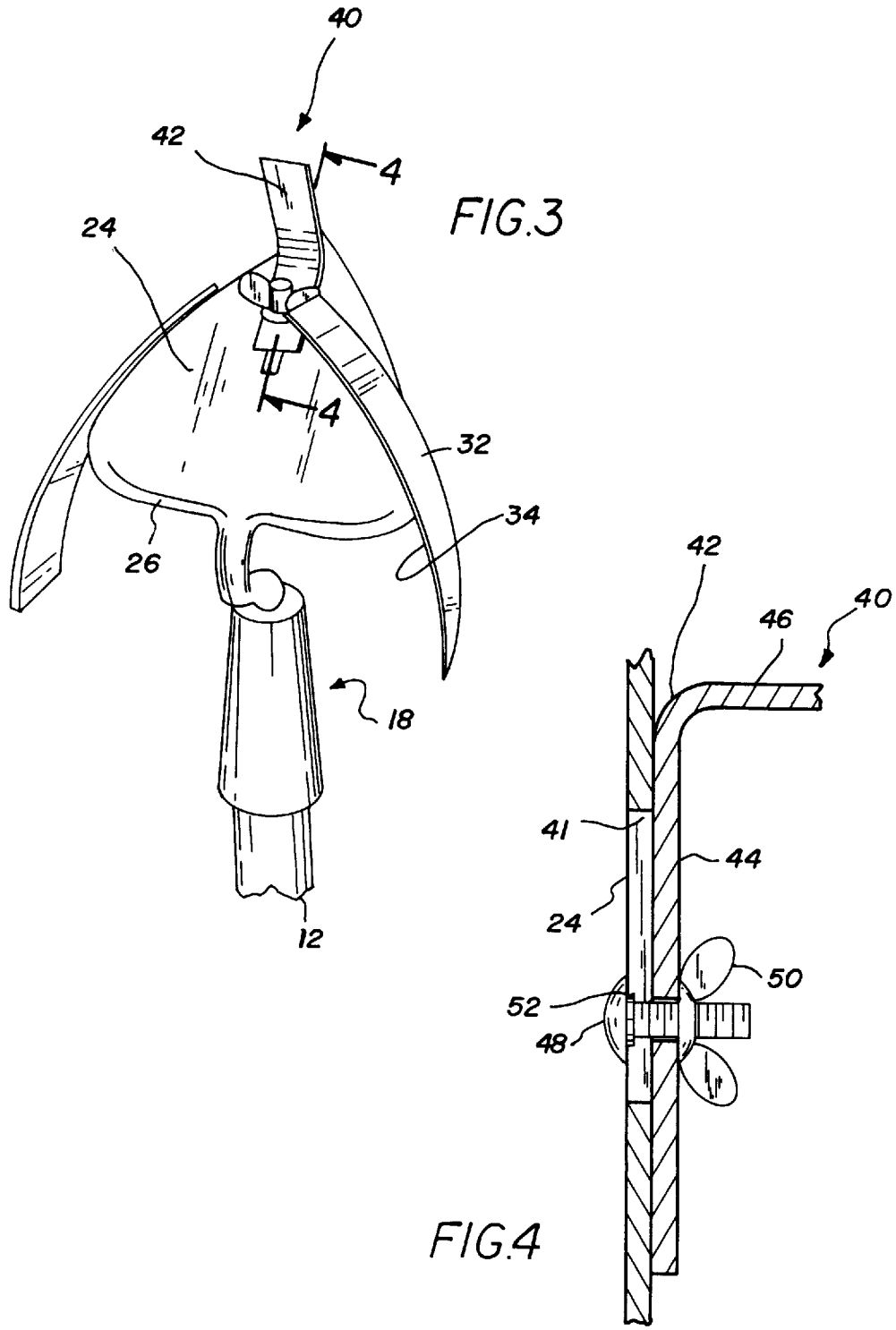

GARDEN TOOL WITH DEPTH CONTROL MECHANISM

BACKGROUND OF THE INVENTION

1. Field of the Invention

The present invention relates to a garden seeding tool and more particularly pertains to controlling the depth a blade of a seeding tool penetrates the ground.

2. Description of the Prior Art

The use of garden tools is known in the prior art. More specifically, garden tools heretofore devised and utilized for the purpose of gardening are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 3,965,990; U.S. Pat. No. 4,319,644; U.S. Pat. No. Des. 359,206; U.S. Pat. No. 4,177,864; U.S. Pat. No. 4,549,611; and U.S. Pat. No. 4,214,538.

In this respect, the garden seeding tool according to the present invention substantially departs from the conventional concepts and designs of the prior art, and in so doing provides an apparatus primarily developed for the purpose of controlling the depth a blade of a seeding tool penetrates the ground.

Therefore, it can be appreciated that there exists a continuing need for a new and improved garden seeding tool which can be used for controlling the depth a blade of a seeding tool penetrates the ground. In this regard, the present invention substantially fulfills this need.

SUMMARY OF THE INVENTION

In view of the foregoing disadvantages inherent in the known types of garden tools now present in the prior art, the present invention provides an improved garden seeding tool. As such, the general purpose of the present invention, which will be described subsequently in greater detail, is to provide a new and improved garden seeding tool which has all the advantages of the prior art and none of the disadvantages.

To attain this, the present invention essentially comprises a handle having an elongated cylindrical configuration. Such handle has a first pointed end and a second end. Next provided is a mounting assembly including a sleeve with a frusto-conical configuration. As shown in the Figures, the sleeve serves to couple with the first pointed end of the handle. The mount assembly further includes a hook having a first end integrally coupled to the sleeve and extending outwardly therefrom. As shown in FIGS. 1 & 2, the hook defines a U-shaped configuration. Also included is a blade having a generally triangular configuration with a first side edge thereof perpendicularly coupled to a second end of the hook of the mounting assembly. The blade further has a second side edge and third side edge defining a pointed end. It should be noted that the blade has arcuate inner and outer surfaces which define a portion of a sphere of a predetermined radius of curvature. A pair of dirt levelers are provided each comprising an arcuate plate with a generally rectangular configuration. Each of the levelers is integrally coupled at a central extent thereof to opposite ends of the first side edge of the blade. As best shown in FIG. 2, a lower edge of each leveler defines a plane which forms an approximate 45 degree angle with the handle. As can be seen in the Figures, the inner and outer surfaces of the levelers define a portion of a cylinder of a predetermined radius of curvature. Finally, a depth adjustment assembly includes a slot formed in the blade adjacent the pointed end of the blade. Such slot resides in perpendicular relationship with the first side edge of the blade. Further included as a component of the depth adjustment assembly is an L-shaped arm including a first plate having a threaded aperture formed therein. Integrally coupled thereto is a second plate. As shown in FIG. 4, the plates form an acute angle with respect to each other. Also included is a bolt for the coupling of the threaded aperture of the arm with the slot of the blade. Such ensures that the second plate of the L-shaped arm is positioned perpendicular with the blade. Further, by such coupling, the arm is allowed to be slidably adjusted with respect to the slot in only a vertical direction. By this structure, the second plate of the arm prevents the pointed end of the blade from penetrating the ground past a predetermined depth.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved garden seeding tool which has all the advantages of the prior art garden tools and none of the disadvantages.

It is another object of the present invention to provide a new and improved garden seeding tool which may be easily and efficiently manufactured and marketed.

It is a further object of the present invention to provide a new and improved garden seeding tool which is of a durable and reliable construction.

An even further object of the present invention is to provide a new and improved garden seeding tool which is susceptible of a low cost of manufacture with regard to both materials and labor, and which accordingly is then susceptible of low prices of sale to the consuming public, thereby making such garden seeding tool economically available to the buying public.

Still yet another object of the present invention is to provide a new and improved garden seeding tool which provides in the apparatuses and methods of the prior art some of the advantages thereof, while simultaneously overcoming some of the disadvantages normally associated therewith.

Still another object of the present invention is to control the depth a blade of a seeding tool penetrates the ground.

Lastly, it is an object of the present invention to provide a new and improved garden seeding tool is provided including a handle and a blade coupled to the handle and having a pointed end. Further included is a depth control mechanism for preventing the pointed end of the blade from penetrating the ground past a predetermined depth.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a view of a front face of blade.

FIG. 4 is a cross-sectional view of the depth adjustment assembly taken along line 4—4 shown in FIG. 3.

Similar reference characters refer to similar parts throughout the several views of the drawings.

DESCRIPTION OF THE PREFERRED EMBODIMENT

Figure 1:
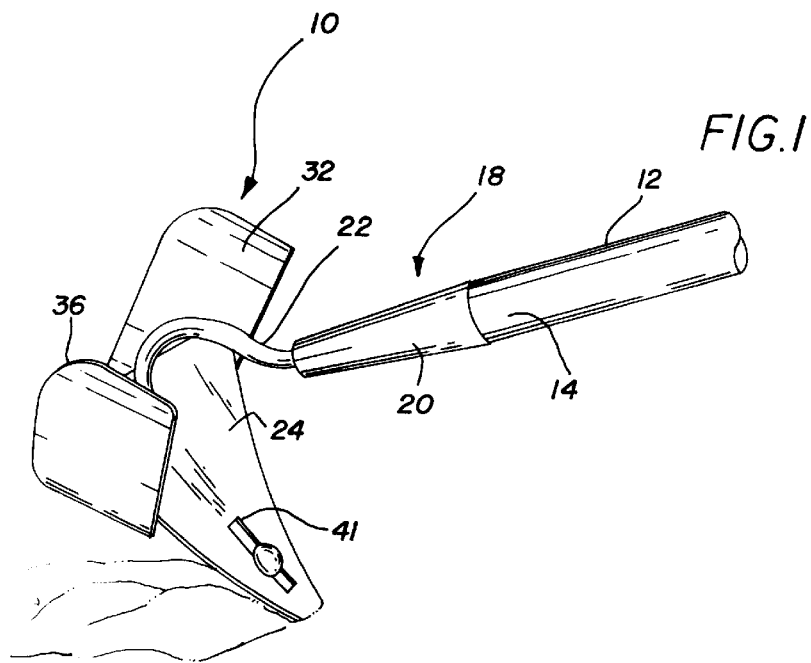
FIG. 1 is a perspective illustration of the preferred embodiment of the garden seeding tool constructed in accordance with the principles of the present invention.

With reference now to the drawings, and in particular to FIG. 1 thereof, a new and improved garden seeding tool embodying the principles and concepts of the present invention and generally designated by the reference numeral 10 will be described.

The present invention, the new and improved garden seeding tool, is comprised of a plurality of components. Such components in their broadest context include a handle, mounting assembly, blade, dirt levelers, and depth adjustment assembly. Such components are individually configured and correlated with respect to each other so as to attain the desired objective.

More specifically, it will be noted that the system 10 of the present invention includes a handle 12 having an elongated cylindrical configuration. Such handle has a first pointed end 14 and a second end. In the alternative, a short handle may also be utilized.

Figure 2:
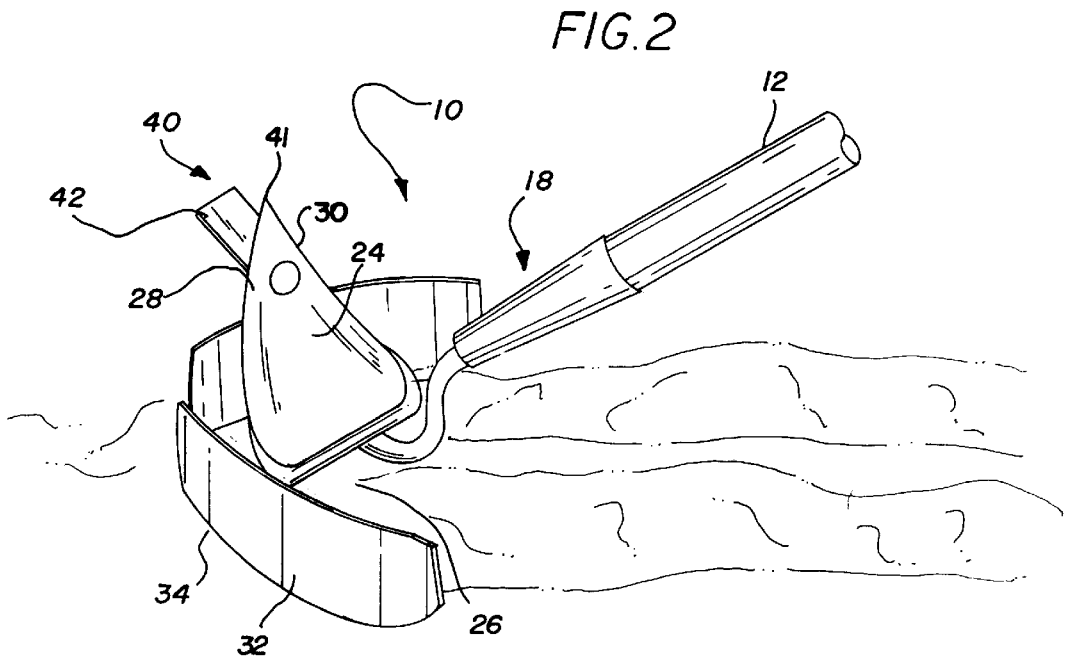
FIG. 2 is a perspective illustration of the present invention with the dirt levelers thereof being utilized.

Next provided is a mounting assembly 18 including a sleeve 20 with a frusto-conical configuration. As shown in the Figures, the sleeve serves to couple with the first pointed end of the handle. The mount assembly further includes a conventional hook 22 having a first end integrally coupled to the sleeve and extending outwardly therefrom. As shown in FIGS. 1 & 2, the hook defines a U-shaped configuration. Further, ends of the hook define a line which is coincident with the handle.

Also included is a blade 24 having a generally triangular configuration with a first side edge 26 thereof perpendicularly coupled to a second end of the hook of the mounting assembly. The blade further has a second side edge 28 and third side edge 30 defining a pointed end. Preferably, the side edges are all of a similar length. It should be noted that the blade has arcuate inner and outer surfaces which define a portion of a sphere of a predetermined radius of curvature.

A pair of dirt levelers 32 are provided each comprising an arcuate plate with a generally rectangular configuration. Each of the levelers is integrally coupled at a central extent thereof to opposite ends of the first side edge of the blade. As best shown in FIG. 2, a lower ground engaging edge 34 of each leveler defines a plane which forms an approximate 45 degree angle with the handle. Such lower edge further has upturned arcuate ends 36. As can be seen in the Figures, the inner and outer surfaces of the levelers define a portion of a cylinder of a predetermined radius of curvature. During use, a 1 and ¼ inch space between the levelers serves to leave a place for dirt to pile up, making a ridge. When the loose dirt settles, it will be level. The ridge acts as a guide for the next furrow.

Figure 5:
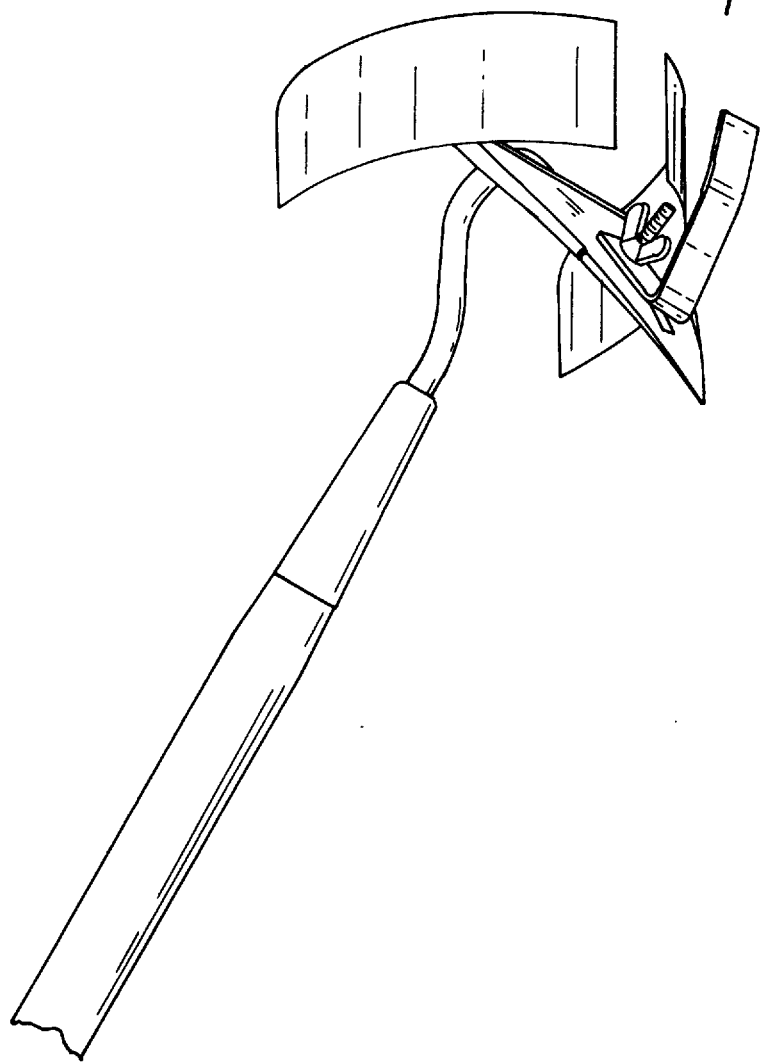
FIG. 5 shows a second plate comprising an outboard half 47 that is upturned.

A depth adjustment assembly 40 includes a slot 41 formed in the blade adjacent the pointed end thereof. Ideally, the slot constitutes about ¼ the height of the blade and is positioned within the lower half of the blade. Such slot resides in perpendicular relationship with the first side edge of the blade. Further included as a component of the depth adjustment assembly is a generally L-shaped arm 42 including a first plate 44 having a threaded aperture formed therein. Integrally coupled thereto is a second plate 46. As shown in FIG. 4, the plates form an acute angle with respect to each other and each have a rectangular shape. Preferably, the second plate has a width of at least ⅙ that of one of the side edges of the blade. Further, it is preferred that the second plate comprise an outboard half 47 that is upturned. Note FIG. 5.

Also included is a carriage bolt 48 and associated wing nut 50 for coupling the threaded aperture of the arm with the slot of the blade. Such ensures that the second plate of the L-shaped arm is positioned perpendicular with the blade. In the alternative, the second plate may be formed at an acute angle with respect to the blade during use. Further, by the aforementioned coupling, the arm is allowed to be slidably adjusted with respect to the slot only in a vertical direction. In the preferred embodiment, rotation of the L-shaped arm is precluded. To accomplish this, the bolt has a square protrusion 52 which is constrained by linear side edges of the slot. By this structure, the second plate of the arm prevents the pointed end of the blade from penetrating the ground past a predetermined depth.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A garden tool comprising, in combination:

a handle having an elongated cylindrical configuration with a first pointed end and a second end;

a mounting assembly including a sleeve having a frusto-conical configuration for coupling with the first pointed end of the handle, the mounting assembly further including a hook having a first end integrally coupled to the sleeve and extending outwardly therefrom thus defining a U-shaped configuration;

a blade having a generally triangular configuration with a first side edge thereof perpendicularly coupled to a second end of the hook of the mounting assembly and a second side edge and third side edge defining a pointed end, wherein the blade has arcuate inner and outer surfaces which define a portion of a sphere of a predetermined radius of curvature;

a pair of dirt levelers each comprising an arcuate plate with a generally rectangular configuration, each pair of levelers integrally coupled at a central extent thereof to opposite ends of the first side edge of the blade, a lower edge of each leveler defining a plane which forms an approximate 45 degree angle with the handle, wherein inner and outer surfaces of the levelers define a portion of a cylinder of a predetermined radius of curvature; and a depth adjustment assembly including a slot formed in the blade adjacent the pointed end of the blade in perpendicular relationship with the first side edge thereof, an L-shaped arm including a first plate having a threaded aperture formed therein and a second plate integrally coupled to the first plate, and a bolt for the coupling of the threaded aperture of the arm with the slot of the blade such that the second plate of the L-shaped arm is allowed to be slidably adjusted with respect to the slot, wherein the second plate of the arm prevents the pointed end of the blade from penetrating the ground past a predetermined depth.

2. A garden tool comprising:

a handle;

a mounting assembly including a sleeve having a frusto-conical configuration for coupling with a first end of the handle, the mounting assembly further including a hook having a first end integrally coupled to the sleeve and extending outwardly therefrom thus defining a U-shaped configuration;

a blade with a generally triangular configuration coupled to a second end of the hook of the mounting assembly and having a pointed end; and a depth adjustment assembly including a slot formed in the blade adjacent the pointed end of the blade, an L-shaped arm including a first plate having an aperture formed therein and a second plate integrally coupled to the first plate, and a bolt for extending through the aperture of the arm and the slot of the blade such that the second plate of the L-shaped arm is allowed to be slidably adjusted with respect to the slot, wherein the second plate of the arm prevents the pointed end of the blade from penetrating the ground past a predetermined depth.

3. The garden tool as set forth in claim 2 and further including a pair of dirt levelers.

4. The garden tool as set forth in claim 3 wherein each dirt leveler includes a plate with a generally rectangular configuration, each leveler integrally coupled at a central extent thereof to opposite ends of a first side edge of the blade.

* * * * *